United States Patent [19]

Peters et al.

[11] Patent Number: 4,701,231
[45] Date of Patent: Oct. 20, 1987

[54] METHOD OF FORMING A JOINT BETWEEN A TUBULAR COMPOSITE AND A METAL RING

[75] Inventors: Stanley T. Peters, Mt. View; Robert L. Kolek, Cupertino; Rolf A. Guenther, Monte Sereno; Jeffrey J. Anderson, Mt. View, all of Calif.; Clarence F. Marshall, Scottsdale, Ariz.

[73] Assignee: Westinghouse Electric Corp., Pittsburgh, Pa.

[21] Appl. No.: 863,484

[22] Filed: May 15, 1986

[51] Int. Cl.[4] .................. B31C 13/00; F16D 1/06
[52] U.S. Cl. .................... 156/172; 138/109; 156/175; 403/404
[58] Field of Search .............. 156/172, 169, 175; 138/109; 464/182, 183; 403/265, 266, 267, 291, 404; 428/36

[56] References Cited

U.S. PATENT DOCUMENTS

| | | | |
|---|---|---|---|
| 3,784,441 | 1/1974 | Kaempen | 156/161 X |
| 3,881,973 | 5/1975 | Dinckney | 156/172 X |
| 4,097,626 | 6/1978 | Tennent | 428/36 |
| 4,118,262 | 10/1978 | Abbott | 156/175 |
| 4,236,386 | 12/1980 | Yates et al. | 156/173 X |
| 4,238,540 | 12/1980 | Yates et al. | 156/173 X |
| 4,256,412 | 3/1981 | Tybus et al. | 403/267 |
| 4,265,951 | 5/1981 | Yates et al. | 156/173 X |
| 4,282,764 | 8/1981 | Harris | 156/173 X |
| 4,385,644 | 5/1983 | Kaempen | 156/173 X |

OTHER PUBLICATIONS

John T. Hofeditz, "Structural Design Considerations for Fiberglass Pressure Vessels", report given at 18th Annual Mtg. of Reinforced Plastics Division of the Society of the Plastics Industry, Inc.
John Zickel, "Isotensoid Pressure Vessels", American Rocket Society Space Flight Report to the Nation, presented in N.Y. Coliseum, Oct. 9-15, 1961.

*Primary Examiner*—Donald E. Czaja
*Assistant Examiner*—Geoffrey L. Knable
*Attorney, Agent, or Firm*—F. J. Baehr, Jr.

[57] ABSTRACT

A method of making a composite to metal joint between a metal ring and a tubular composite formed from crossing helical windings of high strength fibers including the steps of winding the fiber on a mandrel at a helical angle equal to or greater than the slip angle of the fiber and providing the metal ring with a surface in the form of a hyperboloid of one sheet and a pair of isotensoidal surfaces of revolution contiguous with the hyperboloidal surface to form a concave portion in the ring over which the helical fibers form straight lines without bridging and hug these concave surfaces to form an interference fit between the composite and the metal ring.

8 Claims, 7 Drawing Figures

METHOD OF FORMING A JOINT BETWEEN A TUBULAR COMPOSITE AND A METAL RING

BACKGROUND OF THE INVENTION

1. Field of the Invention

This invention relates to a method of fabricating a joint between a helical wound tubular fibrous composite and a metal ring and more particularly to the self-locking effect between the metal ring and fibrous composite overlay which forces the helical wound fibers to fail before separation of the ring and composite can occur.

2. Description of the Prior Art

Methods of making a joint between a tubular filament wound composite and a metal flange have used a long taper joint as in a clamp joint or various combinations using adhesive bonding or bolted fasteners. With these conventional methods the joint is usually the first area in the structure to fail. Failure may be due to failure of the adhesive or fasteners or due to premature failuare of the composite itself because of stress concentrations. Ideally the joint securing arrangement should result in the composite and metal flange acting as one monolithic unit and attaining the full strength capability inherent in the materials used.

U.S. Pat. No. 4,118,262 describes a method of forming filament wound reinforced tubular composites and how to attach them to rings utilizing pins to transfer the load from the component to the ring. Since the pins are cured into the rigid structure the assembly is rigid and conforms to the shape in which it was cured. Load redistribution in the joint is impaired. Therefore, it is desirable, and it is another object of this invention to provide an arrangement where stress concentrations are minimized and load redistribution is free to occur when local deformation results.

U.S. Pat. Nos. 4,265,951; 4,097,626; 4,236,386; 4,385,644; 4,256,412; and, 4,238,540 show joints between composites and metallic parts, but none utilize the joint construction disclosed herein.

While the method for making conventional joints between tubular filament wound composites and a metal flange have been satisfactory for smaller structures, such arrangements are not completely desirable for large structures subject to relatively large forces both static and dynamic. Due to the multiplicity of operations in the forming of these prior art arrangements, they are both laborious and time-consuming to construct. In addition, the ability of these arrangements to support load is highly dependent upon the ability and consistency of the person forming the joint. Therefore, it is also desirable, and it is still another object of this invention to provide a joint which is capable of high loadings, simple to construct and free of workmanship dependent limitations.

SUMMARY OF THE INVENTION

The method of making a composite to metal joint between a metal ring and a tubular composite material formed from continuous strands of high strength fiber wound in criss-crossing helical windings which are bonded by a resinous binder to form the tubular composite structure, when made in accordance with this invention, comprises the steps of:

winding the fiber on a mandrel at a helical angle equal to or greater than the slip angle of the fiber, and providing the metal ring with a surface in the form of a hyperboloid of one sheet. The hyperboloidal surface being so proportioned that the winding angle of the fiber on the mandrel and on the hyperboloidal surface are equal and the fibers extend in generally straight lines hugging the hyperboloidal surface in the metal ring with substantially no bridging and without slipping.

BRIEF DESCRIPTION OF THE DRAWINGS

The objects and advantages of this invention will become more apparent when reading the following detailed description in conjunction with the drawings in which.

DESCRIPTION OF THE PREFERRED EMBODIMENT

Figure 1:
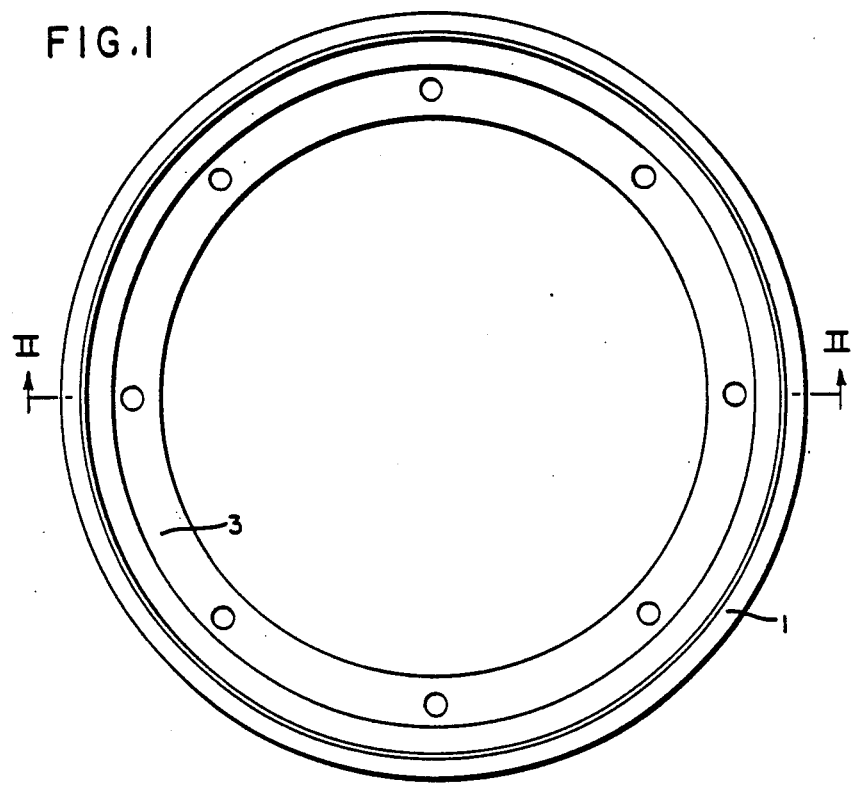
FIG. 1 is an end view of a composite to metal joint made in accordance with this invention.
Figure 2:
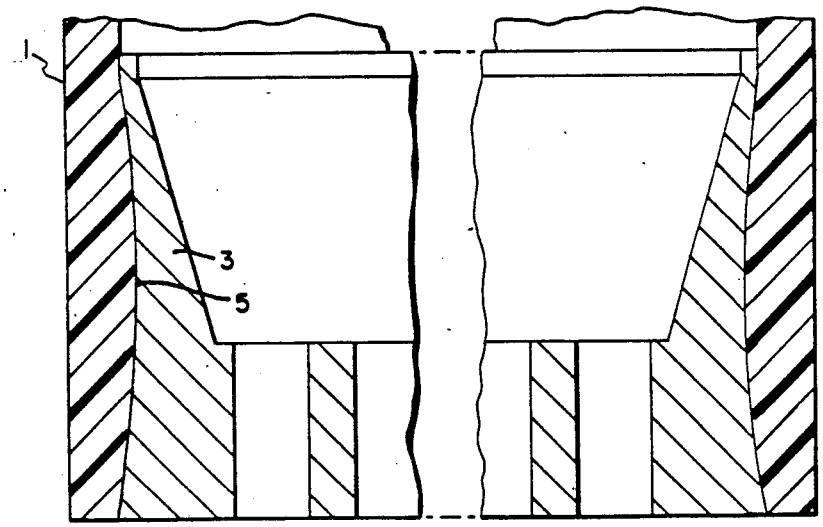
FIG. 2 is a partial sectional view taken on line II—II of FIG. 1.

The method of forming a composite to metal joint will be more easily understood by referring to FIGS. 1 and 2 in which there is shown a juncture between a filament wound composite tube 1 and a metal flange or ring 3. The filament wound composite tube 1 is formed on a mandrel (not shown) which supports the composite tube and the metal flange or ring 3. The filament strands of fiber are wound on the mandrel having pins or other means for reversing the windings on each end of the mandrel and the reversing means are so disposed that the windings form an angle of plus or minus $\rho$ (in the order of plus or minus 20 degrees) with respect to a longitudinal line along the surface of the tube generally parallel to the center line, whereby the fibers form criss-crossing helical spirals. The fiber strands pass through a trough (not shown) filled with a bonding resin before being wound on the mandrel and when the resin is cured forms a tubular composite having high tensile and shear strength with reasonable compressive strength. The ends where the fibers turn are usually machined off so that the helical criss-crossing fibers have the same pattern throughout the length of the tubular member. An adhesive bonding material is placed on the metal flange to form a bond between the flange and the composite tube as the composite tube is wound over the metal ring or flange.

The ring 3 has a surface 5 formed as a hyperboloid of one sheet, a surface of revolution generated by a straight line L, rotated about the axis of the ring. The straight line L neither intersects the axis nor is it parallel thereto. Herein after hyperboloidal surface 5 will mean such a surface.

Since the hyperboloidal surface 5 is generated by a straight line, by generating the surface with a line disposed at an angle $\pm \rho$ with a line parallel to the axis, which is equal to the angle $\pm \rho$ on which the strands of fiber are wound on the mandrel, the strands of fiber hug the hyperboloidal surface 5 without bridging or leaving the surface except where they cross, when they are wound in opposite directions to form the criss-crossing pattern normally utilized in such filament wound composite tubes.

The hyperboloidal surface 5 can be formed as a concave surface in a ring as shown in FIG. 2. The composite is formed with a convex shape which matches the concave surface in the ring locking the composite tubular member in the metal ring to provide a joint with built-in interference fit which maximizes the shear strength for both compressive and tensile loading.

Figure 5:
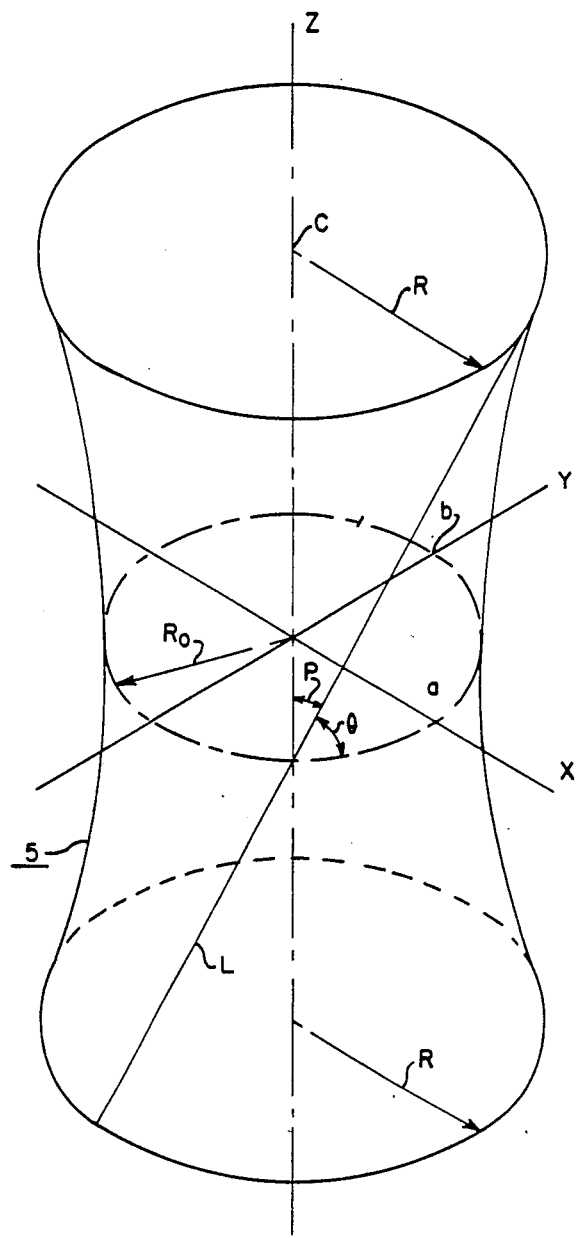
FIG. 5 is an isometric view of a hyperboloid of one sheet.

The hyperboloidal surface 5 is shown in FIG. 5 and is represented by the equation $$\frac{x^2}{a^2} + \frac{y^2}{b^2} - \frac{z^2}{c^2} = 1 \quad (1)$$

$$a = b = R_0 \quad (2)$$

$$z = \tan\theta \, y$$

$\rho$ = fiber winding angle $$\theta = \frac{\pi}{2} - \rho$$

$$\therefore \frac{x^2}{R_0^1} + \frac{y^2}{R_0^2} - \frac{z^2}{C^2} = 1 \quad (3)$$

Substituting 2 into 3

$$\frac{x^2}{R_0^2} + \frac{y^2}{R_0^2} - \frac{\tan^2\theta \, y^2}{C^2} = 1 \quad (4)$$

$$\therefore \frac{x^2}{R_0^2} + \left(\frac{1}{R_0^2} - \frac{\tan^2\theta}{C^2}\right) y^2 = 1 \quad (5)$$

for the line L to be on the hyperboloidal surface 5 then x must be equal to $R_o$ and since Y cannot be at the origin of the axis $Y^2 \neq 0$.

$$\therefore \frac{1}{R_o^2} - \frac{\tan^2\theta}{C^2} = 0 \quad (6)$$

$$\therefore C^2 = R_o^2 \tan^2\theta \quad (7)$$

substituting 7 into 3

$$\frac{x^2}{R_o^2} = \frac{y^2}{R_o^2} - \frac{z^2}{R_o^2 \tan^2\theta} = 1 \quad (8)$$

or $$x^2 + y^2 - \frac{z^2}{\tan^2\theta} = R_o^2 \quad (9)$$

Since x and y are 90° angle apart on the circle R:

$$X^2 + y^2 = R^2 \quad (10)$$

Substituting 10 into 9

$$R^2 - \frac{z^2}{\tan^2\theta} = R_o^2 \quad (11)$$

Equation 11 provides a relationship between the radius of the smallest diameter portion $R_o$, called the circle of the gorge, the radius of the largest diameter portion, R, Z the height of the hyperboloid from the circle of the gorge to one end and $\theta$ which is 90° minus $\rho$. Utilizing equation 11 one can determine a hyperboloidal surface which will exactly fit a tubular composite having the filament strands wound at an angle $\rho$ on a given diameter mandrel.

Figure 3:
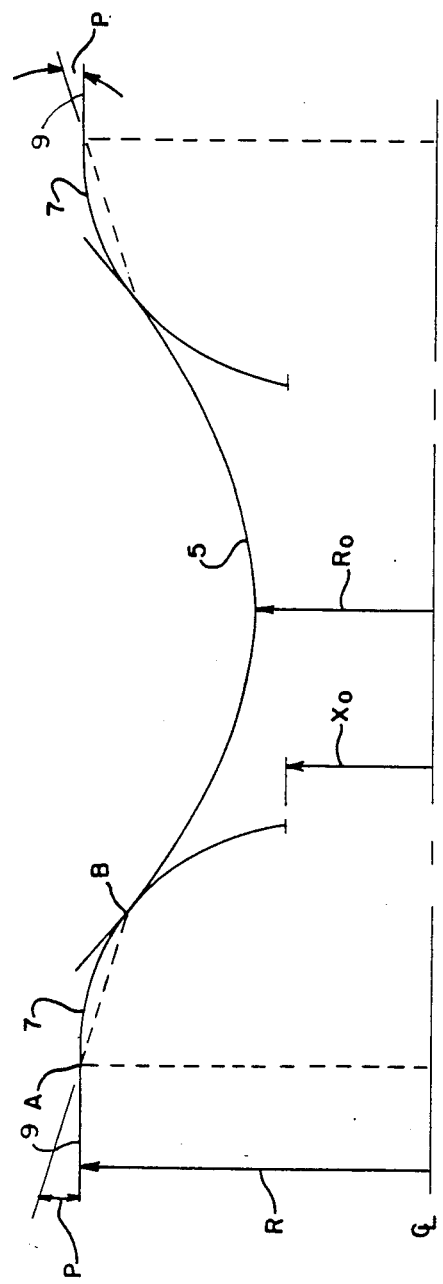
FIG. 3 is a large partial sectional view of the shape of the surface in FIG. 2.

To reduce stress concentrations where the hyperboloidal surface 5 changes to a cylindrical surface, generally the surface of the mandrel, a transition surface is utilized. The transition surface is a curved surface of revolution 7 generally formed by rotating a curved line about the axis of the tubular composite. While the curve may be spherical or some other shape, the preferred shape is shown in FIG. 3 and is a curve that forms an isotensoid dome. Isotensoidal domes are utilized in pressure vessels formed from spiral wound composite material which result in equal stresses in the crossing strands and provides a lay-up which does not slip. Discussion of isotensoidal domes may be found in the Society of the Plastics Industry, Inc., report given at the eighteenth annual meeting of Reinforced Plastics Division held in Edgewater Beach Hotel, Chicago, in a paper written by John T. Hofeditz entitled "Structural Design Considerations for Fiberglass Pressure Vessels"; the American Rocket Society Space Flight Report of the Nation, presented in the New York Coliseum, Oct. 9 through 15, 1961 in a paper written by John Zickel entitled "Isotensoid Pressure Vessels" and finally in the Plastec Report No. 10, published in 1962 by Shibley, A.; Peritt, H. and Eig, M., pages 169 through 176.

The shape of an isotensoid dome which will register with the tubular and hyperboloidal surfaces can be determined by the equation:

$$Y = \left[ \int_{x_1}^{x_2} \frac{-x^3 \, dx}{\sqrt{\frac{x^2 - x_0^2}{1 - X_0^2} - x^6}} \right] + k$$

where $X_o = R \sin \rho$.
$X_o$ = Opening at base of isotensoid dome
$R_1$ Cylinder radius
$\rho$ = Cylinder helix fiber wind angle
X = Radius of isotensoid dome corresponding to:
Y = Lateral displacement along dome centerline.
k = constant.

The lower integration limit for X is $$\frac{1}{R} X_0 \sqrt{3/2} \, .$$

The upper integration limit for X is $$\frac{1}{R} X_0 \sqrt{3/2} \, < X < 1.00.$$

As shown in FIG. 3 by utilizing isotensoidal and hyperboloidal surfaces 7 and 5 transitions can be made with a cylindrical surface 9 and the angle at which the fiber is wrapped can be maintained throughout the winding operation and there will be no bridging or slipping of the fiber strands as the fiber progresses from one surface to the other.

Figure 4:
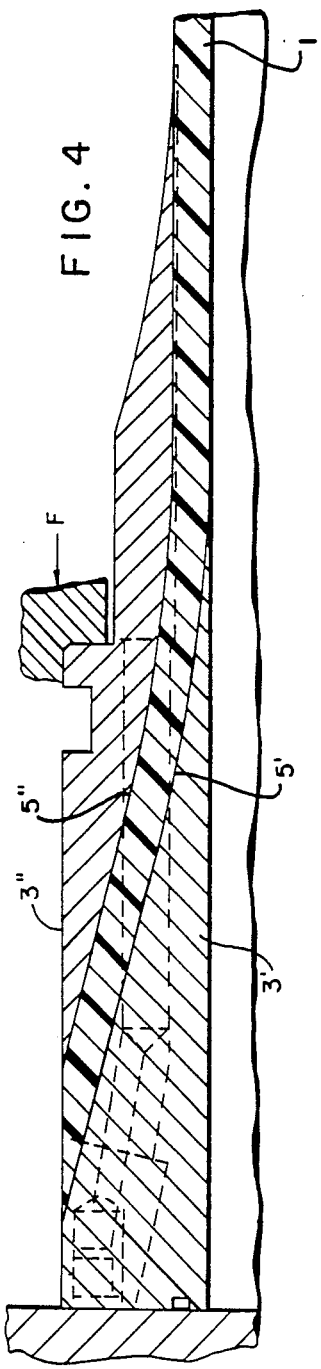
FIG. 4 is a partial sectional view of an alternative embodiment of this invention.
Figure 6:
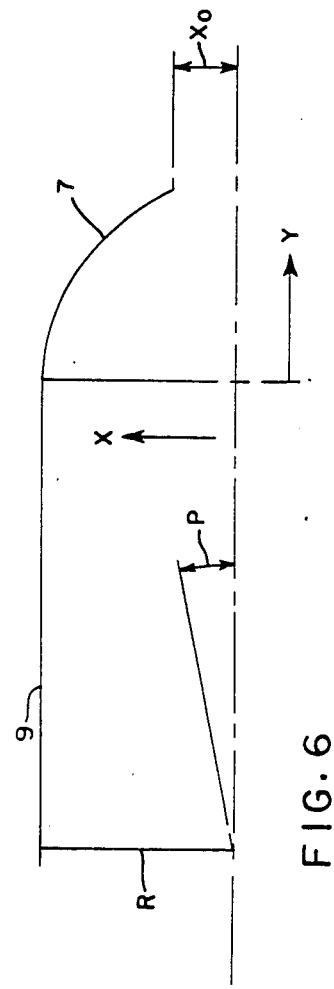
FIG. 6 is a schematic view of a portion of an isotensoid curve utilized to generate an isotensoid dome.

FIG. 4 shows a tubular composite having an end wound on a hyperboloidal surface 5' on a ring 3' and clamped by another hyperboloidal surface 5" on a ring 3" when a force F is applied to the ring 3".

Figure 7:
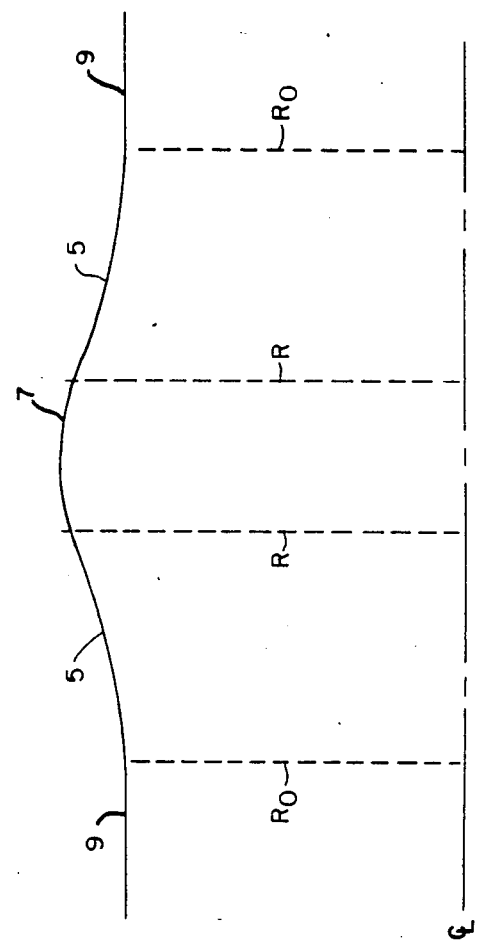
FIG. 7 is a schematic view of a combination of isotensoidal and hyperboloidal curves which may be utilized to form surfaces used in this invention.

FIG. 7 shows a combination of isotensoidal and hyperboloidal curves 7 and 5 which could be utilized to form surfaces of revolutions on metal rings which are joined to tubular composites having cylindrical surfaces 9.

Utilizing the method of forming helical wound composite tubes joined to metal rings having hyperboloidal and isotensoidal surfaces in accordance with the equations set forth hereinbefore provides joints which are simple to build, which are fail-safe, which require less labor to make a more reliable joint in which the strands do not bridge or slip with respect to these surfaces and the shear strength of the joint is maximized for both tensile and compressing loading, and provides a joint that may have the adhesive bond between the composite and the metal ring fail, but the joint will not fail catastrophically unless the composite itself fails, that is, it will not come apart even if the bonded joint fails until the composite fails as there is an interference fit between the metal ring and the composite tube.

What is claimed is:

1. A method of making a composite to metal joint between a metal ring and a tubular composite material formed from continuous strands of high strength fibers wound in crossing helical windings which are bonded by a resinous binder to form the tubular composite structure, said method comprising the steps of:
   winding the fiber on a generally cylindrical surface of a mandrel at a helical angle equal to or greater than the slip angle of the fiber, and
   providing the metal ring with a surface in the form of a hyperboloid of one sheet, the metal ring being positioned on the mandrel, said hyperboidal surface being so proportioned that the winding angle of the fiber on the hyperboloidal surface and on the cylindrical surface of the mandrel are equal and winding the fibers to extend in generally straight lines over the hyperboloidal surface hugging the hyperboloidal surface on the metal ring with substantially no bridging.

2. The method as set forth in claim 1 and further comprising the step of providing a curved surface of revolution in the metal contiguous with the hyperboloidal surface and the cylindrical surface forming a smooth transition from the tubular portion to the hyperboloidal portion of the composite.

3. The method as set forth in claim 2 wherein the curved surface of revolution is isotensoidal.

4. The method as set forth in claim 1 and further comprising the step of forming a curved surface of revolution on the metal ring contiguous with each end of the hyperboloidal surface.

5. The method as set forth in claim 1 and further comprising forming a second hyperboloidal surface similar to the first hyperboloidal surface and forming a curved surface of revolution on the metal ring disposed between the contiguous with the two hyperboloidal surfaces.

6. The method as set forth in claim 5 wherein the curved surface of revolution is isotensoidal.

7. The method as set forth in claim 3 and further comprising the step of providing the isotensoidal surface with a curve defined by the formula $$Y = \left[ \int_{x_1}^{x_2} \frac{-x^3 \, dx}{\sqrt{\frac{x^2 - x_0^2}{1 - X_0^2} - x^6}} \right] + k$$

8. The method as set forth in claim 1 where the relationship between the cylindrical surface on which the tubular composite is formed and the hyperboloidal surface is defined by the formula $$R^2 - \frac{z^2}{\tan^2\theta} = R_o^2$$

* * * * *